(12) United States Patent
Xiong et al.

(10) Patent No.: US 10,966,175 B2
(45) Date of Patent: Mar. 30, 2021

(54) POSITION DETECTION OF USER EQUIPMENT WITHIN A WIRELESS TELECOMMUNICATION NETWORK

(71) Applicant: Nokia Technologies Oy, Espoo (FI)

(72) Inventors: Zhilan Xiong, Bristol (GB); Michel Robert, Nozay (FR)

(73) Assignee: NOKIA TECHNOLOGIES OY, Espoo (NL)

( * ) Notice: Subject to any disclaimer, the term of this patent is extended or adjusted under 35 U.S.C. 154(b) by 32 days.

(21) Appl. No.: 16/323,610

(22) PCT Filed: Aug. 10, 2017

(86) PCT No.: PCT/EP2017/070392
§ 371 (c)(1),
(2) Date: Feb. 6, 2019

(87) PCT Pub. No.: WO2018/029326
PCT Pub. Date: Feb. 15, 2018

(65) Prior Publication Data
US 2020/0196272 A1    Jun. 18, 2020

(30) Foreign Application Priority Data
Aug. 12, 2016    (EP) .................................... 16306049

(51) Int. Cl.
*H04W 64/00*    (2009.01)
*G01S 1/04*    (2006.01)
(Continued)

(52) U.S. Cl.
CPC .......... *H04W 64/003* (2013.01); *G01S 1/042* (2013.01); *H04L 1/18* (2013.01); *H04L 5/0005* (2013.01);
(Continued)

(58) Field of Classification Search
CPC .. H04W 64/003; H04L 5/0005; H04L 5/0053; H04L 5/0048; H04L 1/18
See application file for complete search history.

(56) References Cited

U.S. PATENT DOCUMENTS

2010/0167758 A1    7/2010    Mukai et al.
2011/0039583 A1*    2/2011    Frank .................... H04W 64/00
                                                   455/456.5
(Continued)

FOREIGN PATENT DOCUMENTS

CN    101808411    8/2010
CN    101997568    3/2011
(Continued)

OTHER PUBLICATIONS

Sven Fischer, "Observed Time Difference of Arrival (OTDOA) Positioning in 3GPP LTE," Qualcomm Technologies, Inc., pp. 1-62, XP055284784, Jun. 6, 2014.
(Continued)

*Primary Examiner* — Rina C Pancholi
(74) *Attorney, Agent, or Firm* — Fay Sharpe LLP

(57) ABSTRACT

A method network node, user equipment and location server are disclosed, the method performed at the network node comprises broadcasting position reference signals, the position reference signals being broadcast as a repeating pattern within a periodically repeating position reference signal time period, comprising: controlling the network node to broadcast during each of the position reference signal time periods, a plurality of position reference signal blocks each within a time frequency resource block, at least one of the plurality of position reference signal blocks comprising a plurality of consecutive subblocks, at least one position reference signal subblock comprising a time period in the time frequency resource block during which the network node broadcasts the position reference signal and at least one
(Continued)

muted subblock comprising a different time period within the time frequency resource block during which the network node broadcasts no position reference or data signal in a frequency bandwidth of the time frequency resource block.

20 Claims, 2 Drawing Sheets

(51) Int. Cl.
*H04L 1/18* (2006.01)
*H04L 5/00* (2006.01)

(52) U.S. Cl.
CPC .......... *H04L 5/0048* (2013.01); *H04L 5/0053* (2013.01)

(56) References Cited

U.S. PATENT DOCUMENTS

| | | | |
|---|---|---|---|
| 2011/0081933 A1 | 4/2011 | Suh et al. | |
| 2011/0105144 A1* | 5/2011 | Siomina | G01S 5/0268 455/456.1 |
| 2015/0296359 A1* | 10/2015 | Edge | G01S 1/042 455/404.2 |
| 2018/0217228 A1* | 8/2018 | Edge | H04W 4/02 |

FOREIGN PATENT DOCUMENTS

| | | |
|---|---|---|
| CN | 103178948 | 6/2013 |
| CN | 103209475 | 7/2013 |
| WO | WO 2016/036840 | 3/2016 |

OTHER PUBLICATIONS

International Search Report for PCT/EP2017/070392 dated Sep. 8, 2017.

* cited by examiner

POSITION DETECTION OF USER EQUIPMENT WITHIN A WIRELESS TELECOMMUNICATION NETWORK

FIELD OF THE INVENTION

The invention relates to position detection of user equipment within a wireless telecommunication network.

BACKGROUND

OTDOA or observed time difference of arrival is a downlink positioning method used in networks for detecting a user equipment's position. In particular, network nodes transmit PRS position reference signals and these are detected by user equipment. The time of arrival of the different signals at the user equipment and in particular, the RSTD reference signal time difference measurement at the user equipment can be used as an indication of their location.

Existing OTDOA solutions have some delay in the RSTD measurement and reporting mechanisms and this can lead to inaccuracies when measuring the position of moving user equipment. For example, if there are 16 PRS occasions each 160 ms apart with different network nodes being muted in different ones of these occasions, then RSTD measurement time is at least 16×160 ms=2560 ms which were the UE speed to be 30 KM/h for example then the UE will have moved about 21 m in each RSTD measurement period. Faster moving UEs will of course move further. 160 ms is the closest time period for the PRS occasions and for longer periodicities the errors will be increased.

It would be desirable to produce an improved positioning measurement scheme that was applicable to all UEs, had increased accuracy for moving UEs and did not use an undue amount of resource.

SUMMARY

A first aspect of the present invention provides a method performed at a network node of broadcasting position reference signals, said position reference signals being broadcast as a repeating pattern within a periodically repeating position reference signal time period, said method comprising: controlling said network node to broadcast during each of said position reference signal time periods, a plurality of position reference signal blocks each within a time frequency resource block, at least one of said plurality of position reference signal blocks comprising a plurality of consecutive subblocks, at least one position reference signal subblock comprising a time period in said time frequency resource block during which said network node broadcasts said position reference signal and at least one muted subblock comprising a different time period within said time frequency resource block during which said network node broadcasts no position reference or data signal in a frequency bandwidth of said time frequency resource block.

By dividing at least one position reference signal block into subblocks in the time domain and providing muting in at least one subblock and broadcasting a signal in at least one other subblock, at least one reference position signal is broadcast in the block while some resource of the block is muted leaving it available for other network nodes to broadcast their own position reference signals. This allows the resource of a position reference signal block used by one network node to also be used by a further network node as there is resource available within the muted subblocks. A position reference signal block comprises a time frequency resource block which includes a plurality of physical resource blocks in one or more contiguous carrier frequency resource blocks and contiguous subframes. Each subblock comprises at least one physical resource block comprising at least one subframe.

In effect by dividing a PRS block into subblocks in the time domain, each subblock may be used to either transmit a position reference signal or to be muted, that is not to transmit a data or position reference signal in this time frequency resource subblock. Muting in this way provides an opportunity for one or more further network nodes to use the same position reference signal block provided that a complementary muting pattern is chosen, allowing position reference signals to be transmitted by multiple network nodes within one PRS block. Thus, rather than two nodes muting on different PRS time periods or occasions, muting occurs within one PRS block such that two or more nodes may send their signals in a same PRS block. In order to determine a user equipment's position the user equipment must respond to PRS signals from different network nodes. Thus, responding to different nodes in a same time block enables the time period of the position detection to be reduced which in turn reduces latency and for faster moving UEs in particular, improves accuracy.

In some embodiments, at least two of said plurality of position reference signal blocks broadcast within said reference signal time period are broadcast in different frequency bands.

User equipment which communicate using a wireless communication network are used in increasingly different types of applications and as such are designed with very different properties. There are smart phone user equipment for example which generally have wideband receivers capable of receiving and transmitting a lot of data. These wideband receivers may have bandwidths of between 10 and 30 MHZ, preferably 10 MHZ. Other user equipment may be low complexity equipment used simply to transmit and receive particular information such as a meter reading. These are sometimes termed MTC or machine type user equipment and typically have bandwidths of between 1 and 2 MHZ, preferably 1.4 MHZ. Narrowband Internet of Things devices may have even lower bandwidths perhaps between 100 and 500 KHZ and often 180 KHZ. PRS signals have conventionally been broadcast in a bandwidth suitable for wider band user equipment. This is expensive in resources and where the user equipment has a narrowband receiver this wideband resource is wasted. Thus, in some embodiments the PRS signals may be transmitted in narrower bandwidths perhaps a bandwidth of a narrow bandwidth user equipment. This allows signals to be transmitted at different frequencies and yet still remain with the conventional wideband. These different frequency signals can either be broadcast in the same time period in which case the different signals may be directed to different UEs, or they may be broadcast in different time periods in which case they will be directed to the same UE, the idea of changing the frequency being to increase the frequency bandwidth of the signals received while not reserving an increased bandwidth for the broadcast of the signal.

In this regard, using a reduced frequency bandwidth has the advantage of reducing resources used; however, it has a disadvantage of reduced accuracy of measurement. In order to address this and still used reduced resources it may be advantageous to transmit different PRS blocks at different frequencies. In this way position reference signals across a wider frequency range are transmitted while only a reduced bandwidth is reserved at any one time for these signals.

In some embodiments, each of said plurality of said position reference signal blocks comprise at least one position reference subblock and at least one muted subblock, while in other embodiments a subset of the position reference signal blocks contain broadcast and muted subblocks while another subset comprise uniform subblocks, all broadcasting PRS signals or all muted.

In some embodiments, each of said plurality of reference signal blocks are broadcast within a predetermined frequency bandwidth, at least two of said position reference signal blocks broadcast subsequent to each other are broadcast at frequencies that are remote from each other by at least one of said predetermined bandwidth.

In some cases, it may be advantageous if the position reference signals that are transmitted closest to each other in time are not close to each other in frequency, that is they do not form adjacent frequency bandwidths but are remote from each other by at least one of the predetermined frequency bandwidths. This allows for an increased overall bandwidth of the signals that are transmitted and may reduce interference effects.

In some embodiments, said method comprises following broadcast of one of said plurality of position reference signal blocks waiting a predetermined time before broadcasting a subsequent position reference signal block such that there is a time gap between broadcast of said position reference signal blocks within said position reference time period.

It may be advantageous to leave a time gap between broadcast of the position reference signals and this is particularly the case where frequency hopping is involved as the user equipment receiving the signals will need to change the frequency bandwidth of the receiver to compensate for the frequency hopping of the reference signals and as such, providing a time delay may enable the user equipment to perform this action in good time to receive this signal.

In some embodiments, each of said position reference blocks comprises a same broadcast pattern of said position reference subblock and said muted reference subblock.

Providing a same pattern for each position reference block provides a configuration that is easier to define and communicate to the different elements involved and one which is simple to execute and produce a complementary pattern to.

In other embodiments, at least two of said position reference blocks broadcast within a position reference signal time period comprises a different broadcast pattern of said subblocks.

Although the simplest solution may be to have identical subblock patterns within all position reference signal blocks in a position reference signal time period, in some embodiments they may be different. Having different blocks allows a greater choice of patterns for muted and signal subblocks. In this regard, in some cases a whole block may be muted or a whole block may contain a position reference signal.

In some embodiments, at least one of said position reference signal block comprises at least two position reference signal subblocks and at least one muted subblock, at least one of said position reference signal subblocks being broadcast before and at least one after said muted subblock.

In some cases the muted subblock in at least one of the blocks will not be an edge of the position reference signal block, while in other cases it may be.

In some embodiments, said method further comprises transmitting position reference signal configuration information to at least one further network node, said position reference signal configuration information comprising an indication of a broadcast pattern of said at least one position reference signal subblock and muted subblock within at least one of said position reference signal block.

The configuration information regarding how the position reference signals are to be broadcast may be transmitted to a further network node which may be a base station (e.g. eNB) or a location server. The configuration information includes the broadcast pattern of the subblocks within at least one position reference block. Where the position reference blocks are identical then configuration information for one block will be sufficient. However, where position reference blocks broadcast within a position reference time period are different then a plurality of such configuration information will be transmitted. This further network node may then transmit the information to user equipment, in some cases via this network node. In some embodiments the further network node may use this information to analyse signals received from user equipment in response to the position reference signal blocks broadcast.

In some embodiments, said reference signal configuration information further comprises at least one of: a period of repetition of said position reference signal time period, an indication of a subframe of a start of a first position reference block in a first position reference time period, a number of physical signal blocks transmitted in each of said position reference signal time periods, an indicator of a pattern of frequency locations of said position reference signal blocks broadcast within said position reference signal time period, a number of position reference subblocks in each position reference block, a number of subframes between transmission of position reference blocks within a position reference time period.

In order for the user equipment to be able to monitor the appropriate resources and for the further network node to analyse the response signals received from the user equipment further configuration information regarding the PRS signals may be required.

In some embodiments, the method further comprises receiving reference signal configuration information from at least one further network node, said method comprising receiving response signals from a user equipment to said position reference signals broadcast by said network node and by said at least one further network node and deriving location information for said user equipment from said received responses.

The network node may also receive configuration information from other network nodes indicative of the resources they are using to broadcast PRS blocks. This allows the network node to be able to analyse responses from user equipment both to its own position reference signals but also to those broadcast by other network nodes. With suitable analysis a location of a user equipment can be derived. Conventionally this has not been done at a network node itself but rather at a location server which although in some embodiments is on the network node is often remotely located within a control node. Performing the analysis at the network node that transmits the position reference signals reduces latency and again helps in increasing the accuracy of the analysis of a position of a user equipment, particularly a fast moving user equipment.

A second aspect provides a network node for broadcasting position reference signals as a repeating pattern within a periodically repeating position reference signal time period, said network node comprising: a transmitter for broadcasting signals; control circuitry for controlling said transmitter to broadcast within each of a plurality of position reference signal time periods, a plurality of position reference signal blocks, at least one position reference signal block in a time frequency resource block, said at least one position reference signal block comprising at least one position reference signal subblock comprising a time period in said time frequency resource block during which said network node broadcasts said position reference signal and at least one muted subblock comprising a different time period within said time frequency resource block during which said network node broadcasts no position reference or data signal in a frequency bandwidth of said time frequency resource block.

In some embodiments, the network node is configured to broadcast at least two of said plurality of position reference signal blocks broadcast within said reference signal time period in different frequency bands A third aspect provides a method performed at a location server comprising: receiving position reference signal configuration information from a network node for at least one user equipment, said position reference signal configuration information comprising: an indication of a broadcast pattern of at least one position reference signal subblock and muted subblock within at least one position reference signal block broadcast by said network node, said at least one position reference signal block being broadcast in a time frequency resource block and each subblock being broadcast for a different time period within said time period of said frequency resource block; transmitting said position reference signal configuration information towards said at least one user equipment; and receiving user equipment responses to said broadcast position reference signals.

A location server may be used to analyse the responses of the user equipment to the different position reference signals and in such a case, the location server will be provided with configuration information from the network node indicating how the broadcasting of position reference signals is configured. It will forward this information to the user equipment and it will also use it in its analysis of responses to the signals from the user equipment and it will also transmit this information to the user equipment. In some cases it may receive configuration information for multiple network nodes that has a complementary muting and broadcast pattern, and the location server will transmit this configuration information to the user equipment and receive user equipment response signals pertaining to responses to PRS signals broadcast by each of the network nodes during a same PRS time period.

In some embodiments, said configuration information comprises configuration information for a plurality of position reference signal blocks, said configuration information indicating that at least two of said plurality of position reference signal blocks broadcast within said reference signal time period are broadcast in different frequency bands.

A fourth aspect provides a method performed at a user equipment, said method comprising: receiving position reference signal configuration information for a network node and a further network node, said position reference signal configuration information comprising: an indication of a time frequency resource of a plurality of position reference signal blocks to be broadcast by said network node and an indication of a time frequency resource of a plurality of position reference signal blocks to be broadcast by said further network node, said reference signal configuration information further comprising an indication of a broadcast pattern of at least one position reference signal subblock and muted subblock within at least one position reference signal block broadcast by each of said network node and said further network node; wherein at least one of said time frequency resource of said position reference signal to be broadcast by said first and said further network node are a same time frequency resource, said broadcast patterns of each being complementary broadcast patterns; monitoring for said position reference signal at said indicated time and frequency resources; and transmitting responses to receipt of said position reference signals broadcast during said at least one same time frequency resource to said network node and said further network node.

User equipment is provided that is able to detect PRS signals from multiple network nodes within a time period of one PRS block. In this regard the time frequency resource of the PRS block that contains signals from more than one network node is divided in the time domain into subblocks and each network node broadcasts a PRS block in this time frequency domain that has a different complementary muting and broadcast pattern such that one of the network node broadcasts a PRS block during a subblock time period during which the other node is muted, and vice versa. This allows signals from two or more network nodes to be received during a time period of one PRS block reducing latency in the response time of the user equipment. Where a user equipment is moving, this ability to respond to two signals in quick succession increases accuracy significantly.

In some embodiments, at least two of said plurality of position reference signal blocks broadcast within one reference signal time period are broadcast in different frequency bands, said monitoring step comprising monitoring said different frequency bands during said indicated times.

A fifth aspect of the present invention provides a user equipment comprising: a receiver configured to receive position reference signal configuration information from a plurality of network nodes, said position reference signal configuration information comprising: an indication of a time frequency resource of position reference signal blocks to be broadcast by each of said network nodes, said reference signal configuration information further comprising an indication of a broadcast pattern of at least one position reference signal subblock and muted subblock within at least one of said position reference signal block broadcast by each of said network nodes; wherein at least one of said time frequency resource of said position reference signal to be broadcast by a network node and a further network node are a same time frequency resource, said broadcast patterns of each being complementary broadcast patterns; monitoring circuitry for monitoring for said position reference signals at said indicated time and frequency resources, said user equipment being configured to monitor for signals from said network node and said further network node during said same time frequency resource; and a transmitter for transmitting responses to receipt of said position reference signals broadcast during said at least one same time frequency resource, to said network node and said further network node.

A sixth aspect of the present invention provides a computer program operable when executed by a computer to control said computer to perform steps in a method according to a first, third or fifth aspect of the present invention.

A seventh aspect provides a location server comprising: a receiver configured to receive position reference signal configuration information from a network node for at least one user equipment, said position reference signal configuration information comprising: an indication of a broadcast pattern of at least one position reference signal subblock and muted subblock within at least one position reference signal block broadcast by said network node, said at least one position reference signal block being broadcast in a time frequency resource block and each subblock being broadcast for a different time period within said time period of said frequency resource block; and a transmitter configured to transmit said position reference signal configuration information towards said at least one user equipment; and a receiver configured to receive user equipment responses to said broadcast position reference signals.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
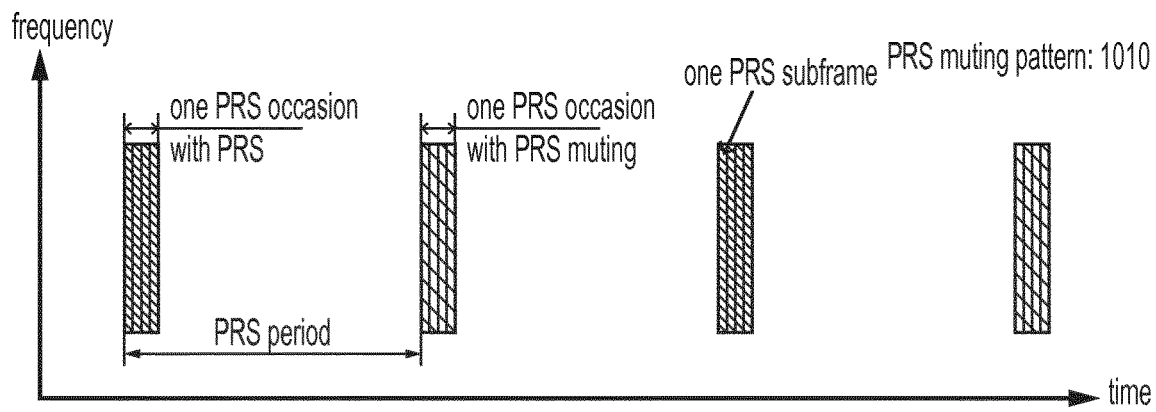
FIG. 1 illustrates PRS signalling according to the prior art.

Before discussing the embodiments in any more detail, first an overview will be provided.

OTDOA observe time difference of arrival is a downlink positioning method used in networks for detecting user equipment's position. In particular, network nodes transmit PRS position reference signals and these are detected by user equipment UE. The time of arrival of the different signals detected at the user equipment and in particular, the RSTD reference signal time difference measurement at the user equipment can be used as an indication of the UE's location. As noted previously when a UE's speed increases, the existing PRS configuration and RSTD reporting mechanisms for OTDOA positioning will result in serious positioning errors due to the RSTD measurement reporting delay. In this regard, PRS signals are conventionally transmitted as multiple PRS blocks within a time period sometimes denoted as a PRS occasion. The transmission of these signals within this time period is repeated periodically a predetermined number of times.

Conventionally, the PRS signal has been broadcast across a relatively wide frequency band within one or more subframes and in order to avoid interference with neighbouring nodes, there may be muting pattern so that for some of the time periods in the periodic repeating pattern rather than transmitting the PRS signals, the network node will be muted such that in the time frequency resources where the PRS signals are muted, no PRS and no data signals will be broadcast, leaving this PRS time frequency resource available for other network nodes to transmit their PRS signals. This means that for a user equipment to receive PRS signals from multiple network nodes, multiple time periods will have passed and thus, these multiple time periods will be required before it can determine the relative time differences between arrival of these different signals. This has been addressed in embodiments of the invention by in effect providing a finer muting and broadcast pattern. This is done by dividing a PRS block into subblocks in the time domain and providing a broadcast pattern for each block such that some of the subblocks are used by one network node for broadcasting PRS signals and some of the subblocks are muted, such that the network node does not broadcast PRS signals or data signals during these muted subblocks. This allows other cooperating network nodes to use these resources for broadcast of their own PRS signals.

In this way, cooperating network nodes will have complimentary broadcasting patterns for PRS signals and muting signals in the same time frequency resources, such that if network node 1 transmits a first subblock with a PRS signal, a second sub block as a muted sub block and a third sub block as a PRS signal, then in the same time frequency resource node 2 might be muted in the first sub block, broadcast a PRS signal in the second subblock and be muted in the third subblock. In this way, a user equipment will receive a PRS signal from network node 1 in the first sub block, a PRS signal from network node 2 in the second sub block and a PRS signal from network node 1 in the third subblock. It will therefore be able to determine RSTD measurements for the two nodes within this block and send responses thereto to the network control node or location server determining its location. In this way, delays in the system are significantly reduced and particularly for fast moving user equipment, a more accurate result can be determined.

It should be noted that the particular muting pattern used by the blocks is configurable and configuration information is received at the network node indicating the pattern to be used. This may be configured on deployment of a node and for some blocks, there may be no muted subblocks and the pattern may be a whole block being muted or a whole block being broadcast. However, for at least some of the blocks, there will be some muting some of the time.

In some cases, each block in each PRS time period has the same muting and broadcast pattern while in other cases the patterns between blocks in a particular PRS time period may be different. In each case, the PRS time periods that are repeated will have the same PRS blocks within them.

FIG. 1 shows a conventional solution for the broadcast of PRS signals from a network node. In this example, there are four PRS occasions and there is a muting pattern of 1010. Furthermore, the PRS signal is transmitted across four subframes and is transmitted across a relatively wide frequency band of 10 MHz.

It should be noted that in the conventional solution, one PRS occasion which is periodically repeated with a PRS period could have one, two, four or six PRS subframes and the period of the PRS occasion can be 160, 320, 640 or 1,280 ms. One PRS pattern in the time domain could include 2, 4, 8 or 16 PRS occasions. A PRS occasion is the time period during which the PRS signals are transmitted. The PRS muting pattern indicates whether the PRS in the corresponding PRS occasion is muted or not and in the example of FIG. 1 the muting pattern is 1010, indicates that the signal is not muted for the first and third occasions but is muted for the second and fourth occasions. Where the PRS occasion is muted, then there is no PRS signal and no data transmission and no EPDCCH, in this PRS occasion. This improves PRS hearability for signals from other cells.

Figure 2A:
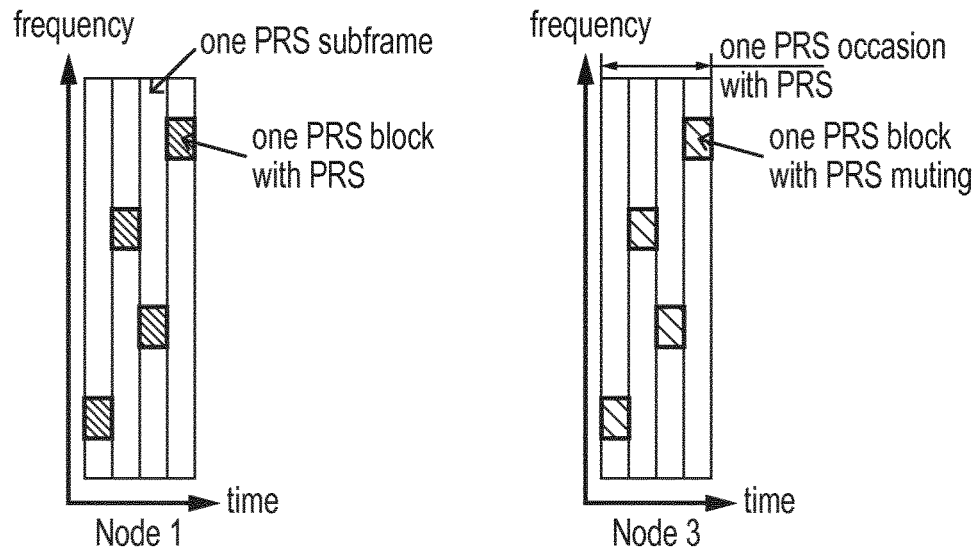
FIGS. 2a and 2b illustrates PRS signalling involving frequency hopping according to a related technique.
Figure 2B:
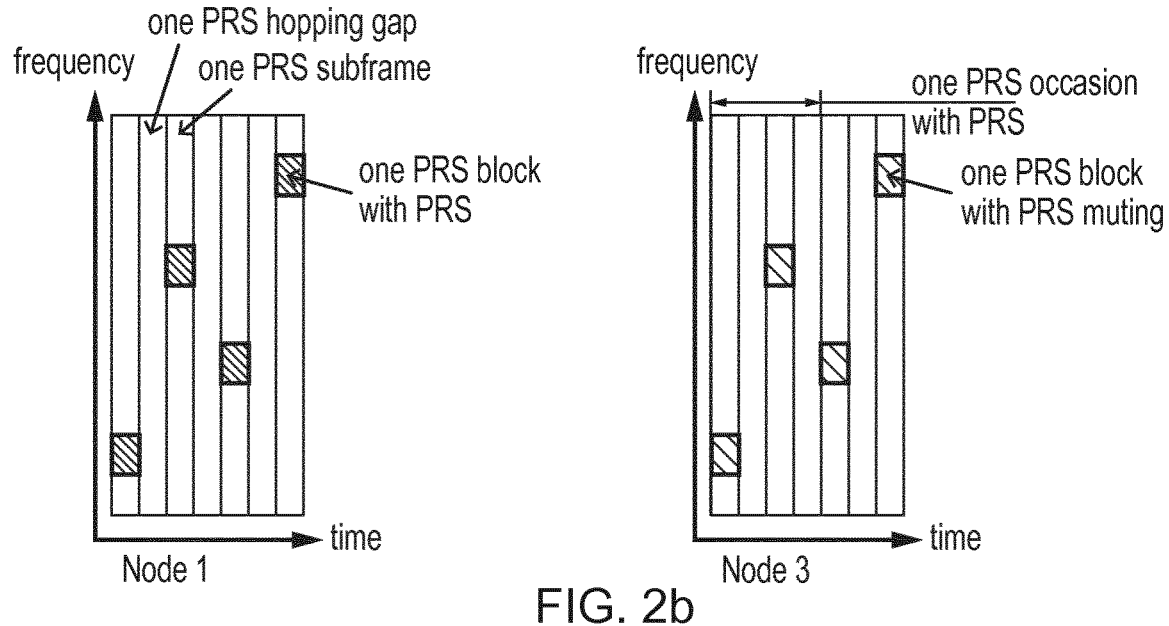

FIGS. 2a and 2b show an alternative pattern of PRS signals broadcast according to a related technique devised by Nokia and detailed in a co-pending application. In this example, the PRS signal is broadcast in narrow bandwidths within the wider bandwidth that was available in the conventional PRS signalling. Thus, in this example, the 10 MHz frequency band is shown but each PRS signal block will only use a subset of this frequency band and in fact, in this example, each PRS signal block covers a bandwidth of 1.4 MHz and one subframe each block having either a muted signal or a PRS signal. There is frequency hopping between the signals such that they are each sent in a different frequency range. It should be noted that the PRS time period and the number of PRS signals broadcast in each time period and their width in the frequency and time domain is all configurable.

In the examples of FIG. 2 there is also a frequency gap equal to the bandwidth of the signal, that is 1.4 MHz, between the different PRS signal blocks. Each PRS block is in this case 1.4 MHz wide in the frequency domain and one subframe wide in the time domain. As can be seen in the figure, the carrier frequencies of one PRS block will be changed in the following PRS subframe according to a predefined frequency hopping pattern and in the case of FIG. 2B, there will be a PRS hopping gap between these PRS blocks. Leaving a time gap between the signals which are transmitted in different frequency bands allow user equipment receiving them to adjust the frequency of its receiver and may improve performance. However, as can be appreciated, it delays the time for receiving the entire signal and thus, for fast moving UEs, may have disadvantages.

As can be seen from FIG. 2, node 3 has a muting pattern that corresponds to the broadcast pattern of node 1. Thus, not only is the frequency bandwidth required for transmitting the PRS signals reduced, but the muting bandwidth is also reduced which means that additional resources compared to the conventional system are available for other signalling. By using frequency hopping, the frequency bandwidth of the entire signal is increased and this can improve the accuracy of measurement while still conserving resources.

Figure 3:
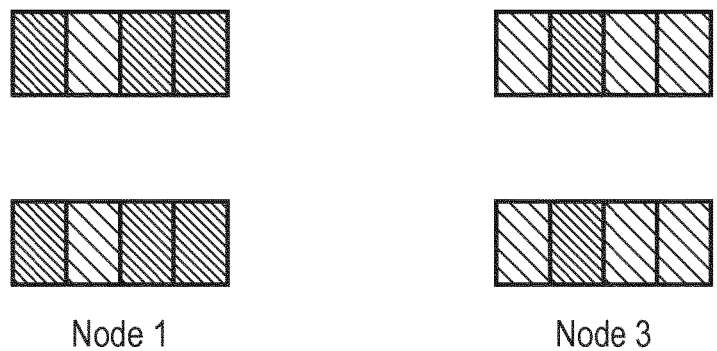
FIG. 3 illustrates PRS signalling with finer muting patterns according to an embodiment.

FIG. 3 shows PRS signals with a muting pattern according to an embodiment of the present invention. In this embodiment, narrowband PRS signals are broadcast but without the frequency hopping. In this embodiment each PRS block is four subframes wide and there is a muting pattern within each PRS block such that for a first subframe, node 1 will broadcast a PRS signal whereas for a subsequent subframe, it will be muted. For the next two subframes, it will broadcast the signal. Cooperating node, node 3, will have a complimentary pattern to this such that during the first subframe it will be muted, and during the second subframe it will broadcast a signal and during the third and fourth subframes it will be muted. In this way, during each PRS occasion multiple network nodes can broadcast PRS signals with complimentary broadcast and muting patterns such that user equipment served by these nodes will receive signals from multiple nodes. Each PRS block includes one or more physical resource blocks (PRB) in contiguous carrier frequencies and in one or more subframes.

Furthermore, as the signals are broadcast in a narrower bandwidth than the conventional signals, more than one set of signals can be broadcast by a network node within a same time period. Where more than one PRS signal is broadcast at a same time, the configuration information sent to the user equipment receiving the signals will depend on their properties. So a wideband UE may receive configuration information for each of the signals and may therefore be able to monitor for and receive each thereby increasing its accuracy. A narrowband UE which cannot receive more than one of the signals may receive configuration information relating to one of the multiple signals sent during one time period, with another narrowband UE receiving configuration information relating to a different one of the multiple signals.

In the embodiment shown the muting pattern for the two blocks shown as being broadcast in a same time period are the same, however, in other embodiments they may be different and in fact the second block may have a complementary broadcast and muting pattern shared with a different cooperating node, so that rather than node 3 having the complementary pattern, a node 4 may have it for the second PRS block.

Figure 4:
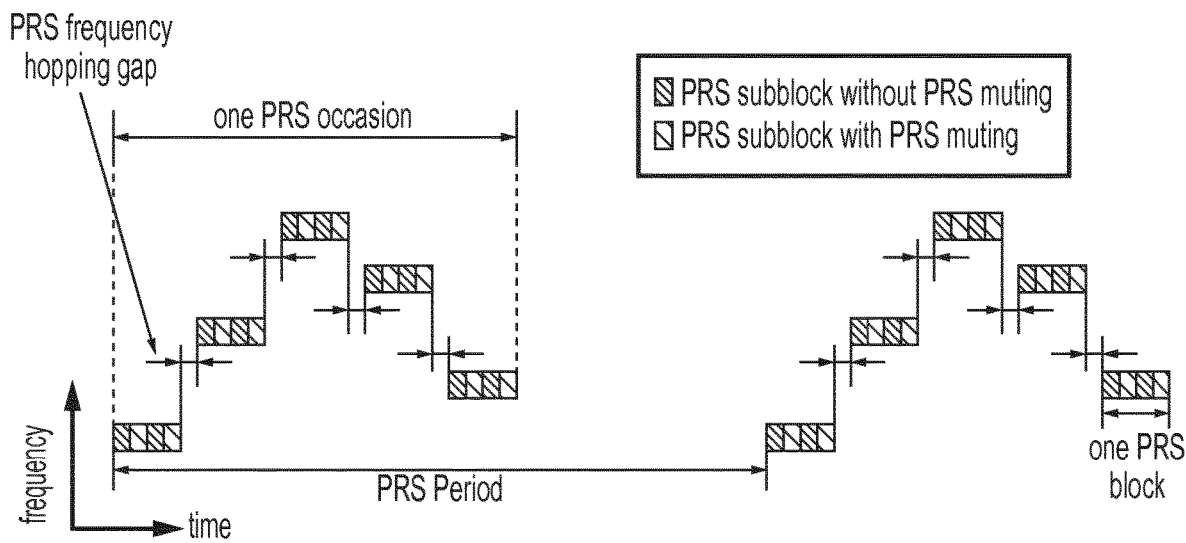
FIG. 4 illustrates PRS signalling with finer muting patterns and frequency hopping according to an embodiment.

FIG. 4 shows an alternative embodiment which combines the finer muting pattern within a PRS block as shown in FIG. 3 with the frequency hopping suggested in FIG. 2. Thus, in this embodiment, reduced frequency bandwidth signals are transmitted in each block and frequency hopping occurs between the blocks, but within each block there is a muting pattern such that cooperating nodes may have complimentary muting patterns and use the same time frequency resources, thereby reducing latency. As there is frequency hopping between the PRS signals within a PRS time period or occasion, there may be a time gap equal to a subframe between the broadcast of the PRS signals allowing the user equipment to adjust to the frequency of its receiver. This of course increases delay to some extent but may improve performance. The frequency hopping increases the bandwidth of the signals as a whole that are received and increases accuracy compared to signals where no frequency hopping occurs without increasing the resources used.

The example shown in FIG. 4 has a PRS time period that is longer than the PRS time period shown in FIG. 1 for the conventional example, however, more signals are sent during this time period and a much reduced frequency band, albeit one that changes during the time period is used. It should be noted that this time period is configurable and will be sent with the rest of the PRS configuration information.

In summary, the PRS signals have a finer muting pattern than the muting pattern of conventional PRS signals, may use a narrower bandwidth, may incorporate more than one PRS signal in a same time period and in addition may utilise frequency hopping to conserve resources and yet widen the bandwidth of the overall signal. The solution with muting is particularly applicable to high speed user equipment. The narrower bandwidth may correspond to that of a narrowband UE such as an MTC UE or narrowband IoT UE.

In the example shown in FIG. 4, there are multiple PRS blocks in one PRS occasion and the carrier frequencies of these PRS blocks is changed based on predefined PRS frequency hopping patterns. One or more of these PRS subblocks have one or more muted PRS subblocks. In some cases there may be zero muted PRS sub blocks within some of the PRS blocks. In each muted PRS subblock there is no data transmission. One PRS block spans one or more PRBs physical resource blocks with contiguous carrier frequencies and with one or more subframes.

The benefits of embodiments are that they provide support for RSTD measurements for more cells in one PRS occasion. They therefore support RSTD measurements for more cells in a shorter time. Embodiments also support PRS frequency hopping which allow for positioning improvement and where narrowband signals are used fewer resources are required.

Figure 5:
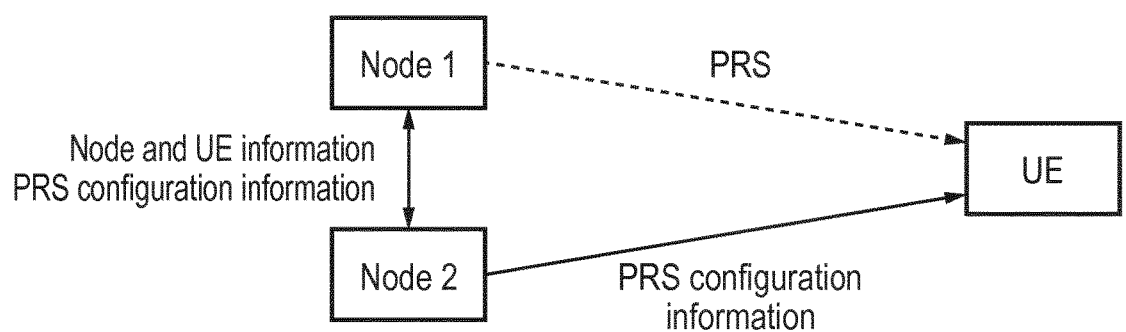
FIG. 5 schematically shows a network according to an embodiment.

FIG. 5 schematically shows a network which is adapted to perform methods according to embodiments. In this embodiment, there is a local node 1 which may be a eNB base station and a node 2 which may also be a base station, but may be a location server. The local node 1 will determine the PRS configuration information for the PRS signal that the local node 1 broadcasts and it will transmit this to the node 2, which will forward it to the UEs. This information may contain the following:

the period of the PRS occasions, the subframe offset of any of the PRS occasion, that is the subframe from beginning of the PRS occasion time period where the first PRS block occurs;

the number of PRS blocks in one PRS occasion; and where there is frequency hopping, the frequency hopping of the PRS blocks.

This may include the frequency hopping offset, the narrowband indication of the first PRS block in one PRS occasion and an indication of the frequency hopping pattern which may be an index in a predefined table. The configuration information may also include the number of PRS subframes in one PRS block, the number of subframes in any PRS frequency hopping gap and also the PRS muting pattern in one PRS block. Where the muting pattern is not the same in each PRS block, there may be multiple muting patterns transmitted in the configuration information.

The configuration information being sent to the node 2 and to the user equipment, allows the user equipment to monitor at the appropriate time and frequency for the PRS signals and also allows the node 2 to perform a location measurement calculation in response to signals received from the UE indicating time differences between when it receives the different PRS signals from different network nodes.

Local node 1 and node 2 may be in the same location and they may share the node and new UE information as well as the PRS configuration information. They may alternatively be in different devices and transmit signals between themselves.

Local node 1 will transmit the PRS signals to the UE the PRS measurements and node 2 will transmit the PRS configuration information to the UE, so that the UE knows how to measure the PRS information.

In some embodiments, the PRS configuration information can also be exchanged between two local nodes where each local node is requesting and/or sending its own PRS configuration to the other local node. This allows location calculations to be performed on the local node which has the advantage of reducing latency and not requiring the information be sent to the location server which may be more remote.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method performed at a network node of broadcasting position reference signals, said position reference signals being broadcast as a repeating pattern within a periodically repeating position reference signal time period, said method comprising:

controlling said network node to broadcast during each of said position reference signal time periods, a plurality of position reference signal blocks each within a time frequency resource block, at least one of said plurality of position reference signal blocks comprising a plurality of consecutive subblocks, wherein at least one position reference signal subblock comprises a time period in said time frequency resource block during which said network node broadcasts said position reference signal and wherein at least one muted subblock comprises a different time period within said time frequency resource block during which said network node broadcasts no position reference or data signal in a frequency bandwidth of said time frequency resource block, wherein at least two of said plurality of position reference signal blocks broadcast within said reference signal time period are broadcast in different frequency bands.

2. A method according to claim 1, wherein at least two of said plurality of position reference signal blocks broadcast in said different frequency bands are broadcast in a same time period.

3. A method according to claim 1, wherein at least two of said plurality of position reference signal blocks broadcast in said different frequency bands are broadcast in different time periods.

4. A method according to claim 1, wherein each of said plurality of position reference signal blocks are broadcast within a predetermined frequency bandwidth, wherein at least two of said position reference signal blocks provided subsequent to each other in time are broadcast at frequencies that are remote from each other by at least one of said predetermined frequency bandwidth.

5. A method according to claim 4, said method comprising following broadcast of one of said plurality of position reference signal blocks, waiting a predetermined time before broadcasting a subsequent position reference signal block such that there is a time gap between broadcast of said position reference signal blocks within said position reference time period.

6. A method according to claim 1, wherein each of said position reference blocks comprises a same broadcast pattern of said position reference subblock and said muted reference subblock.

7. A method according to claim 1, wherein at least two of said position reference blocks broadcast within a position reference signal time period comprises a different broadcast pattern of said subblocks.

8. A method according to claim 1, said method further comprising transmitting position reference signal configuration information to at least one further network node, said position reference signal configuration information comprising an indication of a broadcast pattern of said at least one position reference signal subblock and muted subblock within at least one of said position reference signal block.

9. A method according to claim 1, comprising:
  receiving reference signal configuration information from at least one further network node;
  receiving response signals from a user equipment to said position reference signals broadcast by said network node and by said at least one further network node; and
  deriving location information for said user equipment from said received responses.

10. A non-transitory computer readable medium comprising computer program instructions for causing a computer to at least perform the method according to claim 1.

11. A network node for broadcasting position reference signals as a repeating pattern within a periodically repeating position reference signal time period, said network node comprising:
  a transmitter for broadcasting signals; and,
  a processor for controlling said transmitter to broadcast within each of said position reference signal time periods, a plurality of position reference signal blocks each within a time frequency resource block, at least one of said plurality of position reference signal blocks comprising a plurality of consecutive subblocks, wherein at least one position reference signal subblock comprises a time period in said time frequency resource block during which said network node broadcasts said position reference signal and wherein at least one muted subblock comprises a different time period within said time frequency resource block during which said network node broadcasts no position reference or data signal in a frequency bandwidth of said time frequency resource block, wherein at least two of said plurality of position reference signal blocks broadcast within said reference signal time period are broadcast in different frequency bands.

12. A system comprising a network node according to claim 11, and a user equipment, the user equipment comprising:
  at least one processor; and
  at least one memory including computer program code, the at least one memory and the computer program code being configured to, with the at least one processor, cause the user equipment to receive and detect position reference signals broadcast by said network node and in response to receiving said position reference signals to transmit a response to said position reference signals.

13. A system according to claim 12, wherein the user equipment is configured to perform measurements on said detected position reference signals and said transmitted response comprises measurement results based on the detected position reference signal.

14. A system according to claim 13, wherein said measurement results comprise a time differential of arrival of said position reference signal.

15. A method performed at a location server comprising:
  receiving position reference signal configuration information from a network node for at least one user equipment, said position reference signal configuration information comprising: an indication of a broadcast pattern of a plurality of position reference signal subblocks and muted subblocks within at least one position reference signal block broadcast by said network node, said plurality of position reference signal blocks being broadcast in a time frequency resource block and each subblock being broadcast for a different time period within said time period of said frequency resource block, wherein at least two of said plurality of position reference signal blocks broadcast within said reference signal time period are broadcast in different frequency bands;
  transmitting said position reference signal configuration information towards said at least one user equipment; and
  receiving responses to said broadcast position reference signals from said user equipment.

16. A non-transitory computer readable medium comprising computer program instructions for causing a computer to at least perform the method according to claim 15.

17. A method performed at a user equipment, said method comprising:
  receiving position reference signal configuration information for a first network node and a further network node, said position reference signal configuration information comprising:
  an indication of a time frequency resource of a plurality of position reference signal blocks to be broadcast by said first network node and an indication of a time frequency resource of a plurality of position reference signal blocks to be broadcast by said further network node, said position reference signal configuration information further comprising an indication of a broadcast pattern of at least one position reference signal subblock and muted subblock within at least one position reference signal block broadcast by each of said first network node and said further network node, wherein at least two of said plurality of position reference signal blocks broadcast within said reference signal time period are broadcast in different frequency bands and wherein at least one of said time frequency resource of said position reference signal to be broadcast by said first and said further network node are a same time frequency resource, said broadcast patterns of each being complementary broadcast patterns;

monitoring for said position reference signal at said indicated time and frequency resources; and transmitting responses to receipt of said position reference signals broadcast during said at least one same time frequency resource to said first network node and said further network node.

18. A non-transitory computer readable medium comprising computer program instructions for causing a computer to at least perform the method according to claim 17.

19. A user equipment comprising:

a receiver configured to receive position reference signal configuration information from a plurality of network nodes, said position reference signal configuration information comprising: an indication of a time frequency resource of a plurality of position reference signal blocks to be broadcast by each of said network nodes, said reference signal configuration information further comprising an indication of a broadcast pattern of at least one position reference signal subblock and muted subblock within at least one of said position reference signal block broadcast by each of said network nodes, wherein at least two of said plurality of position reference signal blocks broadcast within said reference signal time period are broadcast in different frequency bands; and wherein at least one of said time frequency resource of said position reference signal to be broadcast by a network node and a further network node are a same time frequency resource, said broadcast patterns of each being complementary broadcast patterns;

a processor for monitoring for said position reference signals at said indicated time and frequency resources, said user equipment being configured to monitor for signals from said network node and said further network node during said same time frequency resource; and a transmitter for transmitting responses to receipt of said position reference signals broadcast during said at least one same time frequency resource, to said network node and said further network node.

20. A user equipment according to claim 19, in which the at least one position reference subblock comprises a time period in said position reference signal block, and the at least one muted subblock comprises a different time period within said position reference signal block.

* * * * *